July 16, 1935.          J. W. McNAIRY          2,008,511
HIGH SPEED PROTECTIVE SYSTEM
Filed April 27, 1934
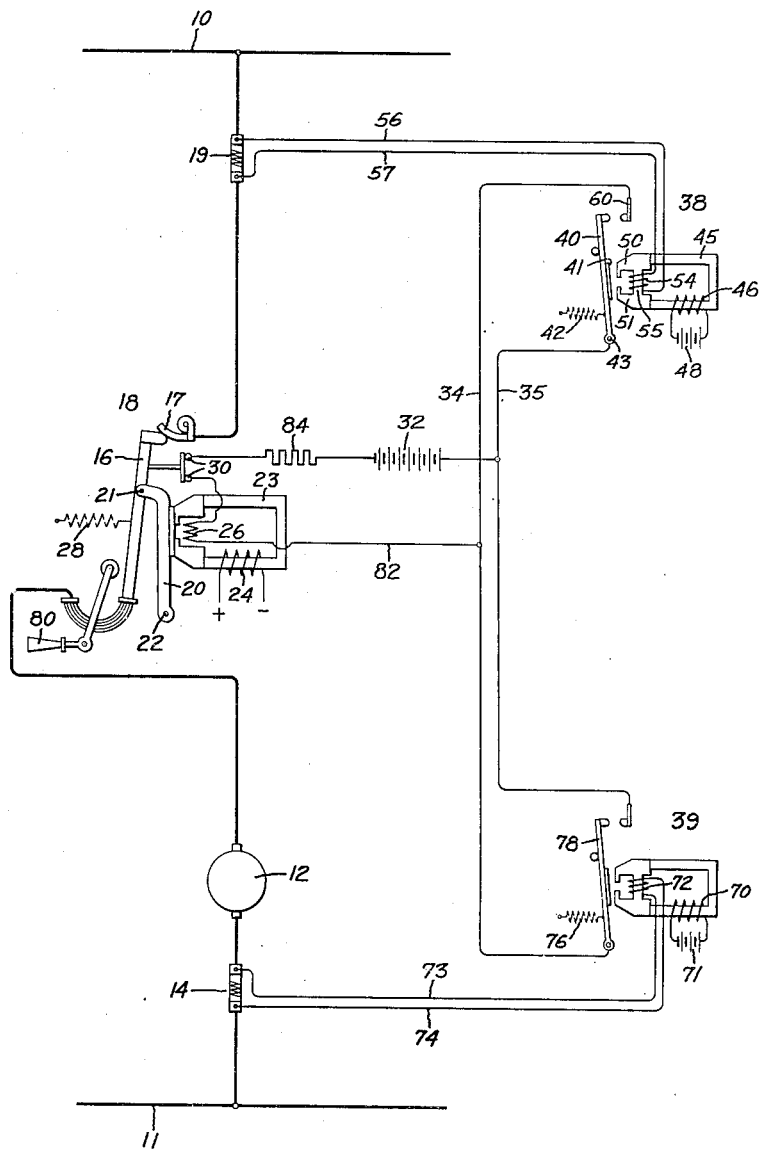
Inventor:
Jacob W. McNairy,
by Harry E. Dunham
His Attorney.

Patented July 16, 1935

2,008,511

UNITED STATES PATENT OFFICE 2,008,511

HIGH SPEED PROTECTIVE SYSTEM

Jacob W. McNairy, Erie, Pa., assignor to General Electric Company, a corporation of New York Application April 27, 1934, Serial No. 722,710

8 Claims. (Cl. 175—294)

My invention relates to high speed circuit controlling devices and high speed protective relay systems wherein circuit breakers are arranged to be opened in response to either reverse current or normal overload current, or both, and has for an object the provision of an inexpensive and reliable system by means of which a single circuit breaker is opened in a minimum amount of time in response to reverse current or overload current.

Though not limited thereto, my invention is particularly applicable to railway systems of the type wherein a network interconnects a number of sets of power converting apparatus, such as rotating converters, arc rectifiers and the like. In such systems the amount of current which is normally supplied to the trolley circuits may be quite high; for example, 10,000 amperes may be supplied continuously. Each circuit breaker connected in the circuit must, therefore, be designed to carry the overload current which may be two or three times the normal rating of the circuit breaker. In addition to the large capacity of the circuit breakers, they must be designed so as to interrupt quickly the circuit in response to an abnormal condition. For example, if one of the brushes of a converter becomes grounded it is possible for all the remaining converters connected to the network to supply power through the grounded brush. Unless the circuit breaker clears the fault in a minimum amount of time a considerable amount of damage to the grounded converter results, if not a disruption of the power supply of the whole system.

The speed with which the circuit breaker must operate has been selected as the time required for an arc to be carried from one commutator bar to another, the result being a flashover of the converter. This time is taken as the time between the instant the current reaches a value which causes persistent arcing under the brushes and which causes a continuous arc between commutator bar and the instant the current is lowered to a value which does not cause this arcing. In order to meet these requirements, the circuit breakers are necessarily of costly construction and it has heretofore been necessary to provide two such circuit breakers for each converter, one circuit breaker being operable to clear the circuit in response to an overload current, the other operable in response to reverse current flow.

In carrying out my invention in one form thereof I control the operation of a single high speed circuit breaker by means of a pair of high speed relays so that the supply circuit will be interrupted in response to a reverse power flow of predetermined magnitude or to a normal power flow of predetermined magnitude, the total time required for the operation of the relays and circuit breaker being less than or equivalent to the time that the current rises to a value which will cause an arc to be carried from one commutator bar to the other on the converter.

In a typical installation it was found that approximately eight thousandths of a second is required after a fault occurs until the current reaches a value which will cause an arc to be carried from one converter commutator bar to the other, i. e., a flashover of the converter. The operating time of certain high speed circuit breakers requires on the order of six thousandths of a second from the time the current starts to rise, due to short circuit or reverse current flow, to the time that the current starts to diminish. Consequently, approximately two thousandths of a second remain within which time the relay must operate to initiate operation of the circuit breaker. There is the further requirement that the relay shall automatically reset itself before the circuit breaker is reclosed in order that the relay will be effective to clear the circuit in case the circuit breaker is closed while a fault exists.

In a further aspect of my invention I provide a relay which meets these requirements. In response to the abnormal flow of power, a strong operating force is instantaneously shifted from a non-effective position with respect to an armature to an effective position with respect to an armature so as to operate quickly the armature from one position to another. The armature is of light weight and is arranged so that it operates through a very short distance to close the relay contacts and thereby complete a tripping circuit for the circuit breaker. The tripping circuit itself is arranged with a high value of resistance with respect to its inductance and is overenergized, thereby minimizing the inherent time delay due to the inductance. The relay armature, biased to the open position, is tripped to the closed position by the abnormal condition. The circuit breaker thereupon clears the circuit, the relay automatically resetting itself in the open circuit position. By connecting one relay for operation in response to overload current flow and a second relay for operation in response to reverse current flow, a single circuit breaker can be used to protect fully the converter.

For a more complete understanding of my invention reference should now be had to the drawing wherein I have shown diagrammatically my invention applied to a system of distribution.

Referring to the drawing, I have shown my invention in one form as applied to a distribution system of the network type represented by supply lines 10 and 11. A rotary converter 12 has one side of its armature connected through a shunt 14 to the supply line 11. The other side of the armature of the converter 12 is connected to the other supply line 10, the circuit extending through a movable switch element 16, of a high speed circuit breaker 18, a stationary contact 17 and a shunt 19. The circuit breaker 18 is of the type described and claimed in Tritle Reissue Patent 15,441 of August 29, 1922 and includes the trip-free feature described and claimed in Tritle Patent 1,560,440 of November 3, 1925.

The circuit breaker 18 may be briefly described by stating that the movable switch member 16 is normally held in circuit closing position by means of an armature 20 mechanically connected by a pivot pin 21 to the movable switch member 16, the opposite end of the armature 20 being pivoted at 22. An electromagnet 23 is provided with a holding coil 24 and a trip coil 26, the holding coil 24 being normally energized from a suitable direct current source of supply as is indicated by the well understood symbols. The trip coil 26 is arranged to effect the release of the armature 20 when the coil is energized with a unidirectional current of predetermined polarity. The arrangement is such that the trip coil 26 when properly energized shifts the holding flux of the electromagnet 23 from the armature 20 across the air gap between the poles of the electromagnet. A very rapid opening of the circuit breaker is accomplished by a powerful spring 28 which strongly biases the relatively light weight movable switch member 16 to the circuit opening position.

The trip coil 26 is connected to a pair of interlock contacts 30 operated with the movable switch member 16 through a suitable source of supply shown as a battery 32 to a pair of conductors 34 and 35, the completion of the energizing circuit of the trip coil 26 being dependent upon the position of one or the other of a pair of relays 38 and 39.

The relays are identical in construction and therefore only the relay 38 will be described in detail. As shown, the relay 38 is provided with a movable contact member 40, an armature portion 41 of which is formed of iron or other suitable magnetic material. A spring 42 strongly biases the switch member 40 about its pivot 43 to its open circuit position. An electromagnet 45 is arranged adjacent the armature 41, a coil 46 encircling the magnet and being energized from a suitable source of supply indicated by the battery 48. The electromagnet 45 is provided with a closed magnetic circuit, two outwardly extending pole pieces 50 and 51 being arranged in spaced relation with the armature 41 and one leg 55 of the electromagnet 45. A trip coil 54 encircles the leg 55 of the electromagnet and is connected across the terminals of the shunt 19 by means of conductors 56 and 57. The coil 46 is normally energized an amount sufficient to saturate the electromagnet 45, the majority of the flux existing in the closed magnetic circuit, only a small proportion of leakage flux being effective on the armature 41.

In case of reverse current flow the rapidly rising current through the shunt 19 causes a current to flow by conductors 56 and 57 through the tripping coil 54. The polarity of the tripping coil 54 is such that its magnetomotive force opposes the magnetomotive force of the coil 46 and is of such magnitude to cause an instantaneous shifting in the flux from the leg 55 of the magnet 45 to the pole pieces 50 and 51. A powerful attractive force is thereupon exerted on the magnetic armature 41 to operate the armature 40 from the open circuit position to the closed circuit position. To further minimize the time of operation, the stationary contact 60 is spaced but a short distance from the movable contact 40. In one embodiment of my invention the gap between the movable and stationary contacts was between $\tfrac{1}{16}$ and $\tfrac{3}{32}$ of an inch, the time required for the relay to close its contacts from the time the current begins to rise in the supply line 10 and 11 being between 1½ thousandths to 2 thousandths of a second. Since the circuit breaker 18 operates to open the circuit in substantially six thousandths of a second it will be seen that the total time required to clear the converter 12 after the occurrence of a reverse flow of current is of the order of eight thousandths of a second, this time being of short enough duration to protect adequately the converter 12 from flashover or other damaging conditions.

After the circuit breaker 18 has opened and cleared the converter 12, the tripping coil 54 of the relay 38 is deenergized, the spring 42 operating the relay contact 40 to the open circuit position. It will thus be seen that the relay automatically resets itself as soon as the circuit breaker clears the circuit, the complications of a trip-free mechanism being thereby eliminated.

It is to be understood that for some installation where the spring 42 is relatively weak, the coil 46 may be deenergized by an auxiliary contact on the main breaker to obtain the automatic reset without the use of complicated trip free mechanism. This interlock closes early during resetting of main breaker.

In order to reclose the circuit breaker 18 after it has been automatically operated to the open circuit position, the closing means represented by the handle 80 is rotated in a clockwise rotation to store energy in the opening spring 28 and to operate the armature 20 into engagement with the holding magnet 23. As soon as this is accomplished the handle 80 is moved in a counter-clockwise direction, the spring 28 rotating the movable switch member 16 about the pin 21 to the closed circuit position. This arrangement insures that the circuit breaker is always free to open its contacts irrespective of the position of the handle 80.

The relay 39 of identical construction has a coil 70 energized from a suitable source of supply, indicated by the battery 71, and has its trip coil 72 connected by conductors 73 and 74 to the terminals of the shunt 14. A spring 76 normally biases the movable contact 78 to the open circuit position.

In order to obtain discriminatory operation of the relays 38 and 39, the shunt 19 is provided with an inductance which is relatively high with respect to its resistance so that a more rapid response of the relay 38 is obtained in case of reverse current flow. With the inductance relatively high at the shunt a rapidly rising current will operate the relay 38 much more quickly than a slowly rising current since the voltage applied to the trip coil 54 will be much greater on the rapidly rising current. The shunt 14 is provided with an inductance which is less in proportion to the resistance than is the shunt 19 and is therefore less sensitive to rapidly rising overload currents than is the reverse current shunt. The two relays are therefore selective in operation. As shown, I prefer to locate the shunt 19 on the positive side of the converter 12 in order to insure protection in the event of a fault anywhere in the circuit on the positive side of the converter.

Since the relays are identical it will be seen that when an overload current of predetermined magnitude flows through the shunt 14 the trip coil 72 is energized to produce a magnetomotive force which in turn causes a strong attractive force to be exerted on the relay armature 78 to operate it to the closed position and thereby complete the energizing circuit for the trip coil 26 of the circuit breaker 18. This circuit may be traced from one side of the battery 32 by conductor 35, contacts of the relay 39, conductors 34 and 82, trip coil 26, interlock contacts 30 and to the other side of the battery 32.

In order to further decrease the time of operation of the circuit breaker after the occurrence of an abnormal condition causing one or the other of the relays to operate, the energizing circuit for the trip coil 26 is provided with a relatively high amount of resistance as compared with its inductance. The resistance may be incorporated in the coil itself or, as shown, it can be included in the circuit as a separate resistor 84. By providing a resistance which is relatively high in proportion to the inductance and supplying a relatively high voltage from the source 32, the rate of rise of the current in the trip coil 26 is substantially increased. The trip coil 26 is protected from this over-excitation since its circuit is opened by the interlock contacts 30 as soon as the circuit breaker is tripped to its open position.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In combination, a translating device, a circuit breaker connected in circuit with said translating device, magnetic latching means for maintaining said circuit breaker in a closed circuit position, means for biasing said circuit breaker from said closed circuit position to an open circuit position, a pair of relays each of which comprises an armature, means biasing each of said armatures to an open circuit position, an electromagnet having a closed magnetic circuit and outwardly extending pole pieces cooperatively associated with each of said armatures, an energizing coil for each of said electromagnets for producing a strong magnetic flux on each of said closed magnetic circuits and a tripping coil arranged adjacent said pole pieces for producing a magnetomotive force to shift the magnetic flux from said closed magnetic circuits through said pole pieces to said armatures whereby said armatures can be quickly operated from said open circuit position to a closed circuit position, means connected in circuit with said translating device and responsive to a predetermined reverse current flow for energizing said tripping coil of one of said relays and means connected in circuit with said translating device and responsive to a predetermined overload current for energizing said tripping coil of said other relay, and means responsive to the operation of either of said relays for releasing said circuit breaker for operation to said open circuit position.

2. The combination with a translating device, a circuit breaker connected in circuit with said device, magnetic latching means for maintaining said circuit breaker in a closed circuit position, means biasing said circuit breaker from said closed circuit position to an open circuit position, a circuit breaker tripping coil for substantially instantaneously rendering said magnetic latching means ineffective, of means for energizing said tripping coil in response to predetermined values of normal or reverse current flow through said circuit breaker comprising a plurality of relays each of which includes a closed magnetic circuit having pole pieces extending outwardly from an interconnecting leg, said leg forming a part of said magnetic circuit, an energizing coil for producing a magnetic flux in said magnetic circuit, a tripping coil associated with said interconnecting leg for producing a magnetomotive force to effect a substantially instantaneous shift of said magnetic flux from said interconnecting leg to said pole pieces, circuit controlling contacts, an armature connected to one of said contacts, means mounting said armature for movement between open and closed circuit positions, biasing means for biasing said relay armature to said open circuit position, current responsive means connected in circuit with said device for producing a voltage proportional to the magnitude and the rate of current rise through said circuit breaker, means connecting respectively the tripping coils of said relays to said current responsive means, the polarity of one of said tripping coils being such that it operates its relay in response to a predetermined reverse flow of current and the polarity of the other of said tripping coils being such that it operates its relay in response to a predetermined normal flow of current, energizing means for said circuit breaker tripping coil, and means interconnecting said relays, said energizing means and said circuit breaker tripping coil so that operation of any of said relays to its closed circuit position energizes said circuit breaker tripping coil to trip said circuit breaker for operation to its open circuit position.

3. The combination with a translating device provided with a commutator made up of a plurality of bars insulated one from the other and a direct current output circuit, a high speed circuit breaker connected in series circuit relation with said direct current output circuit, magnetic latching means for maintaining said circuit breaker in a closed circuit position, means biasing said circuit breaker from said closed circuit position to an open circuit position, a circuit breaker tripping coil for substantially instantaneously rendering said magnetic latching means ineffective, of means responsive to predetermined values of normal or reverse current flow for energizing said tripping coil to trip said circuit breaker, the total time of operation of said circuit breaker and said means being less than the time required for the direct current to rise to a value which will cause an arc to be carried from one of said commutator bars to the other, comprising a pair of relays each of which includes a closed magnetic circuit having pole pieces extending outwardly from an interconnecting leg thereof, said leg forming a part of said magnetic circuit, an energizing coil for producing a magnetic flux in said magnetic circuit, a tripping coil associated with said interconnecting leg for producing a magnetomotive force to effect a substantially instantaneous shifting of said magnetic flux from said interconnecting leg to said pole pieces, a pair of circuit controlling contacts, an armature connected to one of said contacts, means mounting said armature for movement between open and closed circuit positions, biasing means for biasing said relay armature to said open circuit position, a shunt connected on the postive side of said device, means connecting the tripping coil of one of said relays to said shunt, the inductance of said shunt being relatively high with respect to its resistance to produce a quick increase in the excitation of said tripping coil in response to a rapid rise of current in a direction opposite to the normal flow of current, the polarity of said tripping coil being selected to produce a high speed operation of said relay from said open circuit position to said closed circuit position, a second shunt connected on the negative side of said device, means connecting said second shunt to said tripping coil of said other relay, the polarity of said last mentioned tripping coil being selected so that a predetermined value of current flow in the normal direction causes a high speed operation of said relay from said open circuit position to said closed circuit position, energizing means for said circuit breaker tripping coil and means interconnecting said relays, said energizing means, and said circuit breaker tripping coil so that operation of either of said relays to its closed circuit position energizes said circuit breaker tripping coil to trip said circuit breaker for operaton to its open circuit position.

4. The combination with a translating device provided with a commutator made up of a plurality of bars insulated one from the other and a direct current output circuit, a high speed circuit breaker connected in series circuit relation with said direct current output circuit, magnetic latching means for maintaining said circuit breaker in a closed circuit position, means biasing said circuit breaker from said closed circuit position to an open circuit position, a circuit breaker tripping coil for substantially instantaneously rendering said magnetic latching means ineffective, of means responsive to predetermined values of normal or reverse current flow for energizing said tripping coil to trip said circuit breaker, the total time of operation of said circuit breaker and said means being less than the time required for the direct current to rise to a value which will cause an arc to be carried from one of said commutator bars to the other, comprising a pair of relays each of which includes a closed magnetic circuit having pole pieces extending outwardly from an interconnecting leg thereof, said leg forming a part of said magnetic circuit, an energizing coil for producing a magnetic flux in said magnetic circuit, a tripping coil associated with said interconnecting leg for producing a magnetomotive force to effect a substantially instantaneous shifting of said magnetic flux from said interconnecting leg to said pole pieces, a pair of circuit controlling contacts, an armature connected to one of said contacts, means mounting said armature for movement between open and closed circuit position, biasing means for biasing said relay armature to said open circuit position, a shunt connected on the positive side of said device, means connecting the tripping coil of one of said relays to said shunt, the inductance of said shunt being relatively high with respect to its resistance to produce a quick increase in the excitation of said tripping coil in response to a rapid rise of current in a direction opposite to the normal flow of current, the polarity of said tripping coil being selected to produce a high speed operation of said relay from said open circuit position to said closed circuit position, a second shunt connected on the negative side of said device, means connecting said second shunt to said tripping coil of said other relay, the polarity of said last mentioned tripping coil being selected so that a predetermined value of current flow in the normal direction causes a high speed operation of said relay from said open circuit position to said closed circuit position, the inductance of said second shunt being less in proportion than the resistance whereby it is less sensitive to rapidly rising currents than is said first shunt, means connecting the tripping coil of said other relay to said second shunt so as to operate said other relay to said closed circuit position in response to a predetermined overload current in the normal direction, energizing means for said circuit breaker tripping coil, means interconnecting said relays, said energizing means and said circuit breaker tripping coil so that operation of either of said relays to its closed circuit position energizes said circuit breaker tripping coil to trip said circuit breaker for operation to its open circuit position, said circuit breaker tripping coil being provided with a large amount of resistance as compared with its inductance and said energizing means having a voltage of sufficient value to over-excite said circuit breaker tripping coil whereby a substantially instantaneous flow of current in said circuit breaker tripping coil is produced of such magnitude as will produce a substantially instantaneous tripping of said circuit breaker.

5. The combination with a translating device provided with a commutator made up of a plurality of bars insulated one from the other and a direct current output circuit, a high speed circuit breaker connected in series circuit relation with said direct current output circuit, magnetic latching means for maintaining said circuit breaker in a closed circuit position, means biasing said circuit breaker from said closed circuit position to an open circuit position, a circuit breaker tripping coil for substantially instantaneously rendering said magnetic latching means ineffective, of means responsive to predetermined values of normal or reverse current flow for energizing said tripping coil to trip said circuit breaker, the total time of operation of said circuit breaker and said means being less than the time required for the direct current to rise to a value which will cause an arc to be carried from one of said commutator bars to the other, comprising a pair of relays each of which includes a closed magnetic circuit having pole pieces extending outwardly from an interconnecting leg thereof, said leg forming a part of said magnetic circuit, an energizing coil for producing a magnetic flux in said magnetic circuit, a tripping coil associated with said interconnecting leg for producing a magnetomotive force to effect a substantially instantaneous shifting of said magnetic flux from said interconnecting leg to said pole pieces, a pair of circuit controlling contacts, an armature connected to one of said contacts, means mounting said armature for movement between open and closed circuit position, biasing means for biasing said relay armature to said open circuit position, a shunt connected on the positive side of said device, means connecting the tripping coil of one of said relays to said shunt, the inductance of said shunt being relatively high with respect to its resistance to produce a quick increase in the excitation of said tripping coil in response to a rapid rise of current in a direction opposite to the normal flow of current, the polarity of said tripping coil being selected to produce a high speed operation of said relay from said open circuit position to said closed circuit position, a second shunt connected on the negative side of said device, means connecting said second shunt to said tripping coil of said other relay, the polarity of said last mentioned tripping coil being selected so that a predetermined value of current flow in the normal direction causes a high speed operation of said relay from said open circuit position to said closed circuit position, the inductance of said second shunt being less in proportion than the resistance whereby it is less sensitive to rapidly rising currents than is said first shunt, means connecting the tripping coil of said other relay to said second shunt so as to operate said other relay to said closed circuit position in response to a predetermined overload current in the normal direction, energizing means for said circuit breaker tripping coil, means interconnecting said relays, said energizing means and said circuit breaker tripping coil so that operation of either of said relays to its closed circuit position energizes said circuit breaker tripping coil to trip said circuit breaker for operation to its open circuit position, said circuit breaker tripping coil being provided with a large amount of resistance as compared with its inductance and said energizing means having a voltage of sufficient value to over-excite said circuit breaker tripping coil whereby a substantially instantaneous flow of current in said circuit breaker tripping coil is produced of such magnitude as will produce a substantially instantaneous tripping of said circuit breaker, interlock contacts operated with said circuit breaker for deenergizing said circuit breaker tripping coil when said circuit breaker is operated to said open circuit position, the interruption of said direct current circuit automatically deenergizing the tripping coil of the operated relay, said relay armature thereupon being operated by its biasing means to its open circuit position.

6. A high speed electroresponsive device comprising, an armature operable between open and closed positions, means biasing said armature to said open position, an electromagnet having a closed magnetic circuit and pole pieces extending from said closed magnetic circuit to a position adjacent said armature, a coil for producing a strong magnetic flux on said closed magnetic circuit and a tripping coil arranged adjacent said pole pieces for producing a magnetomotive force in a direction to cause an instantaneous shift of said strong magnetic flux from said closed magnetic circuit to said pole pieces whereby said armature is operated quickly from said open position to said closed position.

7. A high speed circuit controlling device comprising, an electromagnet provided with a pair of pole pieces, an armature, means pivotally mounting said armature for movement between open circuit and closed circuit positions, means biasing said armature to said open circuit position, said electromagnet also being provided with a closed magnetic circuit one leg of which interconnects said pole pieces, an energizing coil for said magnet for producing a magnetic flux in said electromagnetic circuit, said interconnecting leg by-passing said flux from said pole pieces and said armature, and a tripping coil wound about said leg for producing a magnetomotive force to shift instantaneously said magnetic flux through said pole pieces to said armature to operate said armature from said open circuit position to said closed circuit position.

8. A high speed relay comprising, an armature operable between predetermined positions, a movable contact operable between open and closed circuit position secured to said armature, a stationary contact mounted in spaced relation with said movable contact, the distance between said contacts being approximately one-sixteenth of an inch when said relay armature is in said open circuit position, an electromagnet provided with a pair of pole pieces mounted adjacent said armature and in spaced relation with each other, a connecting leg magnetically connecting said pole pieces and with a closed magnetic circuit including said connecting leg, an operating coil for producing a strong magnetic flux in said closed magnetic circuit, and a tripping coil surrounding said connecting leg for producing a magnetomotive force to shift said magnetic flux from said closed magnetic circuit to said armature whereby a strong attractive effort is exerted on said armature to operate it from said open circuit position to said closed circuit position.

JACOB W. McNAIRY.